US012768953B2

(12) United States Patent
Strand et al.

(10) Patent No.: US 12,768,953 B2
(45) Date of Patent: Oct. 20, 2026

(54) OPTICAL DETECTOR, SYSTEMS, AND METHODS

(71) Applicant: Attollo Engineering, LLC, Camarillo, CA (US)

(72) Inventors: Timothy A. Strand, Santa Barbara, CA (US); Jonathan Geske, Ventura, CA (US)

(73) Assignee: Attollo Engineering, LLC, Camarillo, CA (US)

(*) Notice: Subject to any disclaimer, the term of this patent is extended or adjusted under 35 U.S.C. 154(b) by 208 days.

(21) Appl. No.: 18/078,633

(22) Filed: Dec. 9, 2022

(65) Prior Publication Data

US 2024/0192326 A1 Jun. 13, 2024

(51) Int. Cl.

| | |
|---|---|
| ***G01S 7/481*** | (2006.01) |
| ***G01S 7/48*** | (2006.01) |
| ***G02B 19/00*** | (2006.01) |

(52) U.S. Cl.

CPC .......... *G01S 7/4816* (2013.01); *G01S 7/4804* (2013.01); *G02B 19/0014* (2013.01); *G02B 19/0076* (2013.01)

(58) Field of Classification Search

CPC . G01S 7/4816; G01S 7/4804; G02B 19/0014; G02B 19/0076

USPC .......................................................... 356/222

See application file for complete search history.

(56) References Cited

U.S. PATENT DOCUMENTS

| | | | | |
|---|---|---|---|---|
| 5,161,051 | A | 11/1992 | Whitney et al. | |
| 8,212,220 | B2 | 7/2012 | Lerch et al. | |
| 10,502,679 | B2 | 12/2019 | Aphek | |
| 10,594,396 | B1 * | 3/2020 | Xia | G01J 1/0266 |
| RE48,763 | E | 10/2021 | Mimeault | |
| 2005/0024729 | A1 * | 2/2005 | Ockerse | G02B 5/08 359/603 |
| 2007/0019899 | A1 * | 1/2007 | Ohtsu | G02B 6/43 385/88 |
| 2017/0184704 | A1 | 6/2017 | Yang et al. | |
| 2024/0053444 | A1 | 2/2024 | Liang et al. | |

FOREIGN PATENT DOCUMENTS

| | | | | |
|---|---|---|---|---|
| AU | 2010202220 B2 | 3/2012 | | |
| CN | 115327551 A | 11/2022 | | |
| WO | WO-2022087384 A1 * | 4/2022 | | G01S 17/894 |
| WO | WO-2022227609 A1 * | 11/2022 | | G01S 17/02 |

OTHER PUBLICATIONS

"Extended European Search Report Mailed on Apr. 30, 2024", 13 Pages.

* cited by examiner

*Primary Examiner* — Sunghee Y Gray

(74) *Attorney, Agent, or Firm* — Billion & Armitage

(57) ABSTRACT

An optical detector configured to detect a presence and a location of modulated light including a wide FOV detector having one or more photodiode and a narrow FOV detector having a narrow-FOV photodiode. The wide FOV detector at least partially surrounds the narrow FOV detector and provides a wide FOV, and the narrow FOV detector provides a narrow FOV. The optical detector can be implemented in a single optical detector system having a single optical path to a single focal plane.

13 Claims, 6 Drawing Sheets

OPTICAL DETECTOR, SYSTEMS, AND METHODS

BACKGROUND

An optical detection system is a system designed for the detection of modulated light sources. For instance, a laser rangefinder may transmit a collimated beam of light to a distant target and the light reflected from the target is detected by an optical detection system. Optical detection systems may be configured to detect modulated light over some field of view ("FOV") and provide information as to the presence of modulated light and/or the location of the modulated light.

SUMMARY

According to some embodiments of the present disclosure, an optical detection system including a lens, a wide field of view (FOV) detector and a narrow FOV detector. The wide FOV detector is configured to detect incident light corresponding to a wide FOV and the narrow FOV detector is configured to detect incident light corresponding to a narrow FOV. The wide FOV detector includes a window and the narrow FOV detector is positioned to detect light incident to the window.

According to some embodiments of the present disclosure, an optical detector configured to detect a presence and a location of modulated light. The optical detector includes a wide FOV detector including one or more wide-FOV photodiodes and a narrow FOV detector including a narrow-FOV photodiode. The narrow-FOV photodiode provides a second FOV and the one or more wide-FOV photodiodes provide a first FOV, the first FOV and second FOV received through a single optical path.

According to some embodiments of the present disclosure, a method of detecting a presence and a location of a modulated light source. The method includes focusing light corresponding to a narrow FOV and light corresponding to a wide FOV onto a detector comprising a narrow FOV detector and a wide FOV detector. The method further includes detecting light corresponding to the narrow FOV at the narrow FOV detector and detecting light corresponding to the wide FOV at the wide FOV detector and measuring one or more optical characteristics of the light detected at the narrow FOV detector and light detected at the wide FOV detector. The method includes generating an output corresponding with light detected by the narrow FOV detector and the wide FOV detector.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Figure 1:
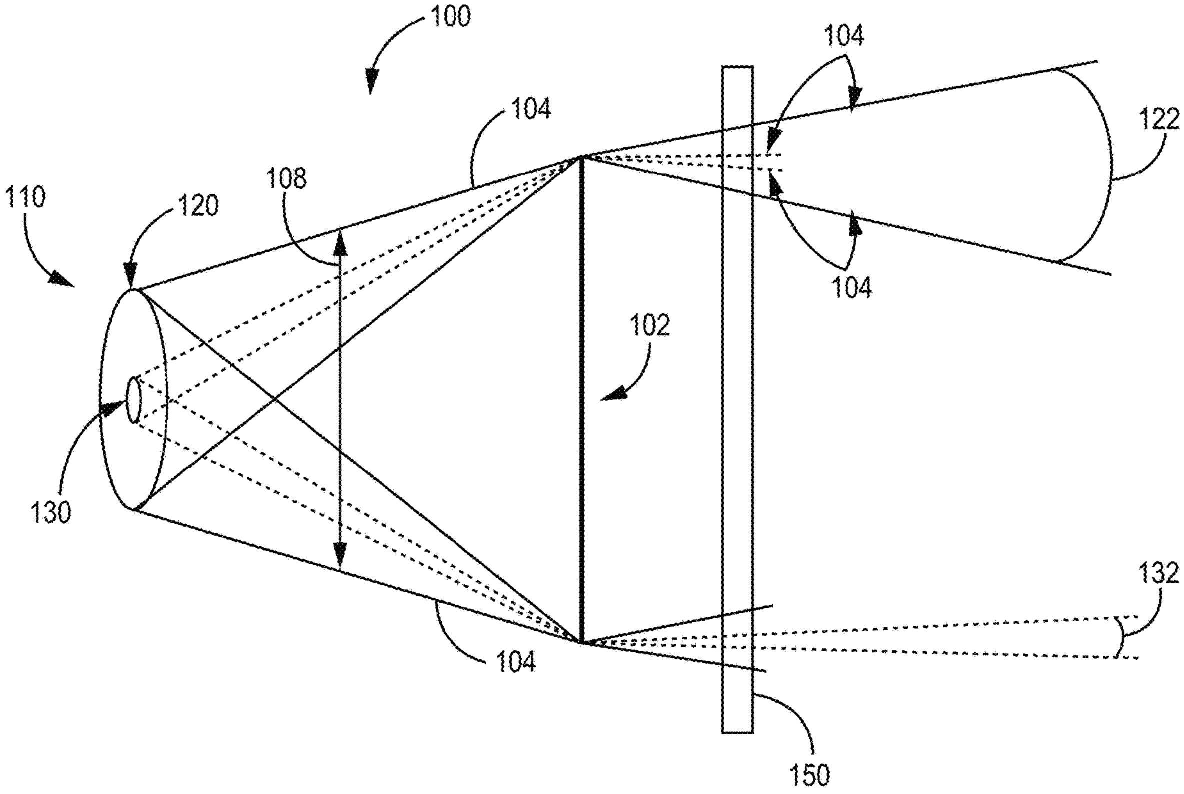
FIG. 1 illustrates an exemplary diagrammatic view of an optical detection system having multiple fields of view, according to some embodiments.

Generally, in applications where the location of the modulated light is not known, the optical detection system is designed for a wide field of view ("FOV"), i.e., the optical detection system is designed to receive light over a large range compared to the angular width of the light source being detected. A wide FOV requires a large detector area, a short-focal length lens, or a combination of the two. In applications where the location of the modulated light is known, the optical detection system is designed for a narrow FOV. A narrow FOV is desirable, as it enables the use of higher-sensitivity detector components, such as avalanche photodiodes and longer length focal lenses.

In some applications, both wide FOV and narrow FOV detection modes may be needed. Typically, two separate optical receiver systems are employed-one optical receiver for wide FOV, and the other optical receiver for narrow FOV. An optical receiver generally includes light concentration elements (e.g., lenses, parabolic reflectors, or other light collection elements) to produce a focal plane or region where the light is substantially focused. Optical receivers generally include optical detector elements (e.g., photodiodes) disposed near the focal plane to convert optical signals into electrical signals and include electronics to measure the electrical signals. The use of two or more optical receivers generally requires the use of two or more light concentration elements producing two or more focal planes and optical detector elements disposed at each focal plane along with electric components. This configuration increases the size, weight, complexity, and power requirements of the optical sensing system.

In other cases, an optical beam splitter may be used to provide two detection paths: a wide FOV detection path wherein a wide FOV detector is disposed on a first focal plane and a narrow FOV detection path wherein a narrow FOV detector is disposed on a second focal plane. However, the beam splitter reduces the intensity of received modulated light signals to each detection path, which diminishes sensitivity and performance of each detection mode.

It would therefore be beneficial to develop a multiple FOV optical detection system having a single optical path to a single detection plane for the modulated light detection. Such system would reduce the size and weight of the system and provide high sensitivity detection of modulated light sources.

This disclosure relates to an optical detection system having a single optical path to a detection plane with multiple fields of view for a given detection plane. The optical detection system includes a lens and a detection plane that includes a wide FOV detector and a narrow FOV detector collocated at a detection plane, or substantially near the focal plane, of the optical system. The detection plane of the optical system is located approximately at the focal distance of the optical system lens (or light collection/concentrating element). Thus, the term "detection plane" refers to the area wherein modulated light received by the optical system is substantially focused. The wide FOV detector has an area and position relative to the lens to detect light corresponding with a wide FOV. The wide FOV detector has a central opening or window: The narrow FOV detector has an area and position relative to the lens to detect light corresponding to a narrow FOV. In particular, the narrow FOV detector is positioned (approximately) within the central opening or window associated with the wide FOV detector. In some embodiments, the narrow FOV detector includes a higher sensitivity detector (e.g., a central avalanche photodiode ("APD")) while the wide FOV detector includes a lower sensitivity detector (e.g., a P-N and/or PIN photodiode).

As described hereinafter, the terms "narrow" and "wide" are used to describe FOV relative to each other. For instance, the narrow FOV detector has a smaller FOV than the wide FOV detector, the wide FOV is larger than the narrow FOV, etc. As described hereinafter, the term "modulated light" refers to light having one or more manipulated parameters, i.e., amplitude, phase, polarization, intensity, pulse frequency, waveform, wavefront, collimation, etc.

FIG. 1 illustrates an exemplary diagrammatic view of an optical detection system 100 having a lens 102 and a multi-field of view ("MFOV") detector 110 configured to detect optical signals in multiple fields of view. The MFOV detector 110 includes a wide FOV detector 120 and a narrow FOV detector 130. The wide FOV detector 120 is configured to detect light over a wide FOV 122 and the narrow FOV detector 130 is configured to detect light over a narrow FOV 132. The wide FOV 122 and the narrow FOV 132 may also be referred to as the first FOV and the second FOV, respectively. As illustrated in FIG. 1, modulated light rays 104 interact with the lens 102 and are directed toward the detector 110. The optical detection system 100 may include an optical filter 150 configured to filter non-modulated light. Thus, only modulated light rays 104 may pass through the optical filter 150 and interact with the MFOV detector 110. In some embodiments, the optical filter 150 may be a coating on one or multiple optical surfaces along the optical receiver path including but not limited to a window in front or behind the light collection elements or applied to surfaces of the light collection elements, or applied to one, or multiple of the FOV detector elements. The optical filter 150 may also be a combination of spectrally specific absorbing, reflecting elements, surfaces, or coatings.

The modulated light rays 104 received on the detector 110 are located within a single optical receiver path 108. In other words, the modulated light rays 104 are received through the lens 102 and directed to a single detection plane. The optical receiver path 108 is not split via a beam splitter, mirror, or other optical device. The wide FOV detector 120 may include a window. The narrow FOV detector 130 may be disposed within the window of the wide FOV detector 120 such that the wide FOV detector 120 at least partially surrounds the narrow FOV detector 130. Both the wide FOV detector 120 and the narrow FOV detector 130 may be disposed on the same detection plane, or in other words, the wide FOV detector 120 and the narrow FOV detector 130 may be located at or substantially near the focal plane of the lens 102 such that the modulated light rays 104 are focused on the wide FOV detector 120 and the narrow FOV detector 130 simultaneously.

In some embodiments, the wide FOV detector 120 may include one or more wide-FOV photodiodes (e.g., P/N and/or PIN photodiodes) and the narrow FOV detector 130 may include a narrow-FOV photodiode (e.g., P/N, PIN, and/or APD). The APD may have a higher optical sensitivity than a P/N or PIN photodiode, and thus, the APD may be more accurate in detection of modulated light sources and may be configured to detect a location of a modulated light source. The wide FOV detector 120 and the narrow FOV detector 130 are configured to detect incident light upon the respective detectors, i.e., modulated light rays 104 that hit the wide FOV detector 120 and the narrow FOV detector 130 are detected. The wide FOV detector 120 and the narrow FOV detector 130 may be electrically isolated from each other such that modulated light rays 104 that hit the wide FOV detector 120 and the narrow FOV detector 130 are detected separately.

In some embodiments, the optical detection system 100 may be configured to detect a presence of modulated light. In other words, a light source outputting modulated light rays 104 located within a FOV (e.g., the wide FOV 122 and/or the narrow FOV 132) of the optical detection system 100 may be detected as the modulated light rays 104 fall incident to the detector 110. Such modulated light rays 104 are received by the detector 110, the detector 110 converting the received optical signal into an electrical signal, and the electrical signal may be measured or analyzed to determine whether the light source is within a FOV of the optical detection system.

In some embodiments, the detection of a presence of modulated light may be a binary output, for instance: YES (modulated light is detected within a wide FOV or narrow FOV) or NO (modulated light is not detected within a wide FOV or narrow FOV). The binary output may be based on whether a single threshold is met. In other embodiments, the detection of a presence of modulated light within a FOV may include a plurality of confidence intervals corresponding to a plurality of thresholds. In some embodiments, the optical detection system 100 may be configured to detect multiple presences of modulated light simultaneously. The optical detection system may be configured to identify optical characteristics of received light, i.e., a pulse frequency, polarization, intensity, phase, wavelength, etc., to identify the type of light source and to distinguish the received optical signals from background light sources.

In some embodiments, the optical detection system 100 may be configured to detect the presence of a laser rangefinder and/or a laser guidance system. Such configuration may be beneficial for both military and civilian applications to alert the optical detection system 100 and/or user of the system of a laser operating within the FOV(s) of the system. For example, in military applications the optical detection system 100 could detect a presence of a laser rangefinder (e.g., an enemy combatant pointing a laser range finder at the optical detection system 100 or user) or could detect the presence of a laser guidance system (e.g., an enemy weapon system pointed toward the optical detection system 100). Likewise, such configuration would be beneficial in civilian applications as it may help detect distant objects, establish lines of sight, improve long range communication, etc.

In some embodiments, the optical detection system 100 may be configured to detect a location of a modulated light source. In other words, the optical detection system may be configured to detect the position within the relevant FOV of the modulated light source. Detection of the location of a modulated light source often requires a high sensitivity, narrow FOV detector such as an APD. In some embodiments, the optical detection system 100 includes the narrow FOV detector 130 having an APD to detect the location of a modulated light source. In some embodiments, the wide FOV detector 120 and/or the narrow FOV detector 130 may be divided into a plurality of detector segments (see e.g., FIG. 4C), each of the detector segments corresponding to a sub-FOV. Detection of a modulated light on a detector segment may indicate the modulated light source is located within the respective sub-FOV.

Figure 2:
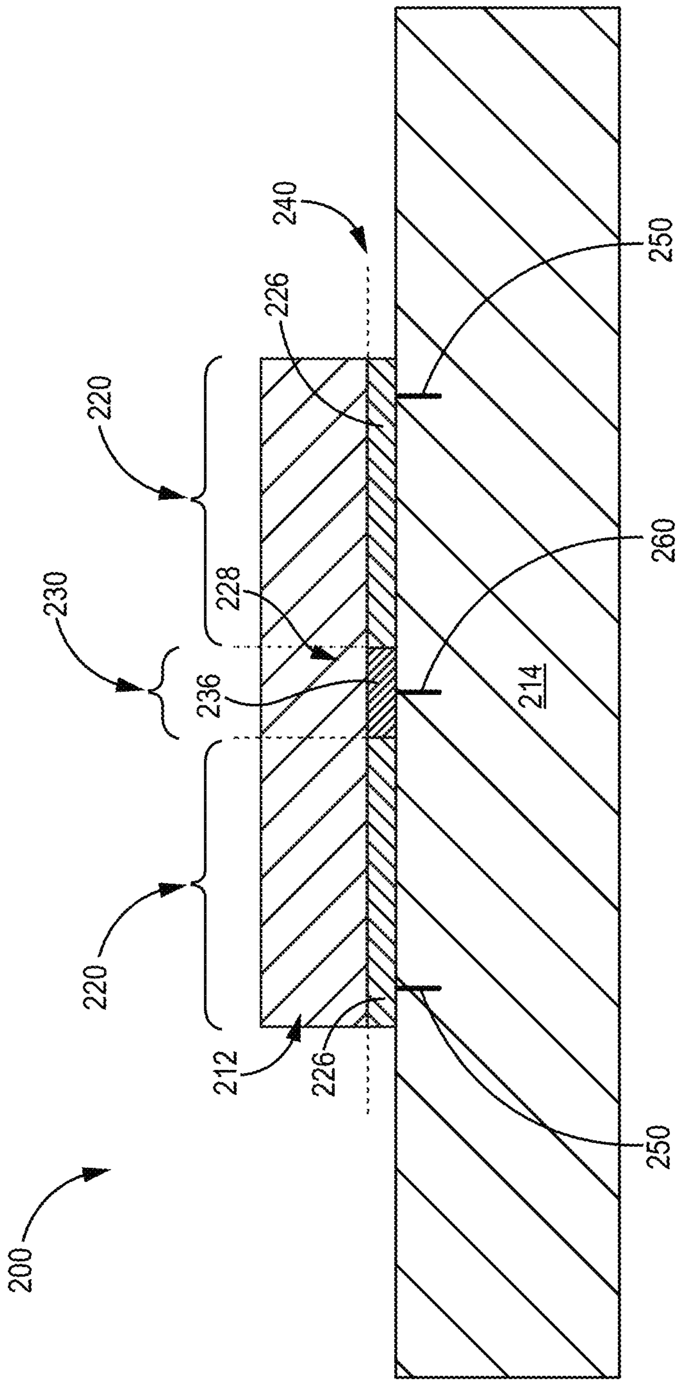
FIG. 2 illustrates a diagrammatic cross-sectional side view of an optical detector including a wide FOV detector and a narrow FOV detector located in the same detection plane, according to some embodiments.

FIG. 2 illustrates a diagrammatic cross-sectional side view of an optical detector 200 including a wide FOV detector 220 and a narrow FOV detector 230 located in the same detection plane 240. The detection plane 240 may be located at or substantially near the focal plane of the lens or light concentration system (not shown in FIG. 2).

The optical detector 200 includes a detector substrate 212 and a sub-mount 214. The detector substrate may include an anti-reflective coating and/or an n-type layer. The wide FOV detector 220 may be electrically connected to the sub-mount 214 via one or more first wired connector 250. The narrow FOV detector 230 may be electrically connected to the sub-mount 214 via a second wired connector 260. The wired connectors 250, 260 may be configured to supply a reverse voltage to the respective detector and/or transfer electrical signals from the respective detector to the sub-mount 214. The wired connectors 250, 260 may include an anode and/or a cathode connection configured to generate an electric field and/or an applied bias electric field to collect and sweep charge carries toward the wired connectors 250, 260. The sub-mount 214 may include a printed circuit board assembly ("PCBA"), which may include a central processing unit ("CPU"), a power source, a display, a reverse-bias voltage connection, a wired connection port to external systems, a wireless connection feature to external systems, and/or other optical electronics components known in the art.

In some embodiments, the wide FOV detector 220 includes one or more wide-FOV photodiodes 226. The wide-FOV photodiode 226 includes a p-type semiconductor region and an n-type semiconductor region forming a P/N photodiode. The wide-FOV photodiode 226 may include an intrinsic semiconductor region separating the p-type region from the n-type region thereby forming a PIN photodiode. The wide FOV detector 220 includes a window 228 disposed at the center of the optical detector 200. The window 228 allows light to pass through the wide FOV detector 220 and interact with the narrow FOV detector 230.

In some embodiments, the narrow FOV detector 230 includes a narrow-FOV photodiode 236. The narrow-FOV photodiode 236 may include a p-type semiconductor region and an n-type semiconductor region forming a P/N photodiode. The narrow-FOV photodiode 236 may include an intrinsic semiconductor region separating the p-type region from the n-type region thereby forming a PIN photodiode. The narrow-FOV photodiode may comprise an APD (avalanche photodiode).

In some embodiments, the wide FOV detector 220 has a first surface area and the narrow FOV detector has a second surface area 230. The first surface area may be greater than the second surface area.

Figure 3:
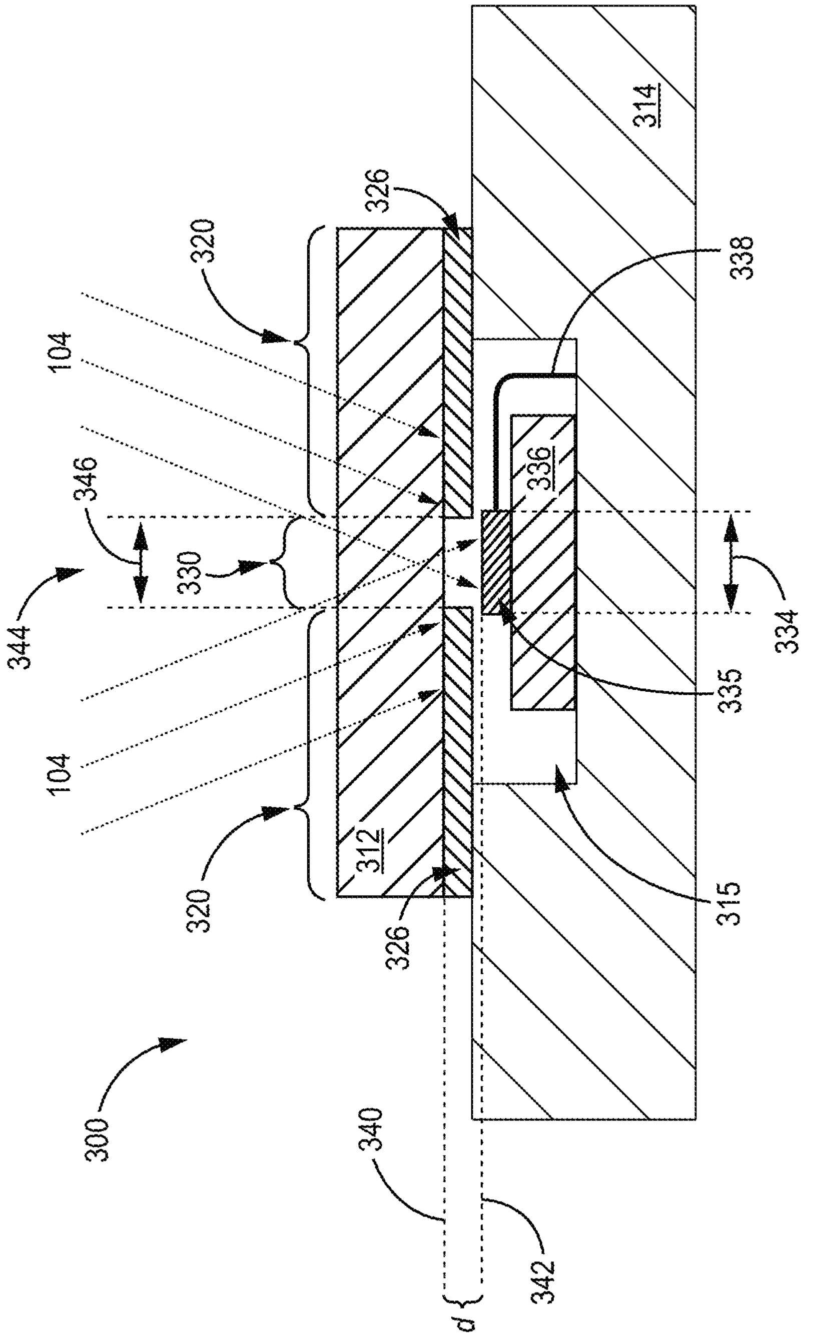
FIG. 3 illustrates a diagrammatic cross-sectional side view of an optical detector including a wide FOV detector and a narrow FOV detector located in the different detection planes, according to some embodiments.

FIG. 3 illustrates a diagrammatic cross-sectional side view of an optical detector 300 including a wide FOV detector 320 located in a first detection plane 340 and a narrow FOV detector 330 located in a second detection plane 342. The optical detector 300 further comprises a wide FOV detector substrate 312, a narrow FOV detector substrate 336, a narrow FOV detector connection 338, and a sub-mount 314. In some embodiments (such as the embodiment illustrated in FIG. 3), the sub-mount 314 may be recessed, i.e., the sub-mount 314 includes a recessed portion 315 recessed within a top surface of the sub-mount 314. The recessed portion 315 of the sub-mount may offset the first detection plane 340 from the second detection plane 342 by a distance d (also referred to as an offset d). In other embodiments, such as illustrated in FIG. 2, the first detection plane 340 is on an equal plane with the second detection plane 342, or in other words, the two detection planes are co-planar.

The wide FOV detector 320 may include a window 344 having a window area 346 to allow modulated light rays 104 to pass through the wide FOV detector 320. In some embodiments, a light absorbing layer (i.e., an intrinsic layer or n-doped layer) may be removed from the wide FOV detector 320 to form the window 344. The narrow FOV detector 330 may be disposed under the window 344 to receive the modulated light rays 104. The narrow FOV detector 330 defines a narrow FOV detector area 334, and in some embodiments, the narrow FOV detector area 334 is greater than the window area 346. In this embodiment it is possible, by making the narrow FOV detector area 334 larger than the window area 346 in the wide FOV detector 320, to eliminate completely the gaps between detector elements, enabling collection of light without any lossy areas.

The two optical detection planes 340, 342 separated by the offset d are located within the same plane of focus of the optical detection system 300. In other words, the narrow FOV detector 330) and the wide FOV detector 320 are located at, or substantially near, the focal plane of the light concentration element (not shown in FIG. 3). The offset d and the light concentration element (e.g., a lens) can be configured to focus received modulated light upon the wide FOV detector 320 and the narrow FOV detector 330 simultaneously. Thus, the optical detection planes 304, 342 are at, or substantially near, the focus of the light concentration element of the optical system 300 and can be considered a single effective detector plane. The offset d may be to the same order of magnitude of the depth of focus of the light concentration elements.

In some embodiments, the wide FOV detector 320 includes one or more wide-FOV photodiodes 326. The wide-FOV photodiode 326 includes a p-type semiconductor region and an n-type semiconductor region forming a P/N photodiode. The wide-FOV photodiode 326 may include an intrinsic semiconductor region separating the p-type region from the n-type region thereby forming a PIN photodiode. The wide-FOV photodiode 326 may receive a reverse bias voltage from one or more wired connectors 350. The one or more wired connectors may be configured to carry an electrical signal between the sub-mount 314 and the wide-FOV photodiode 326.

In some embodiments, the narrow FOV detector 330 includes a narrow-FOV photodiode 335. The narrow-FOV photodiode 335 may include a p-type semiconductor region and an n-type semiconductor region forming a P/N photodiode. The narrow-FOV photodiode 335 may include an intrinsic semiconductor region separating the p-type region from the n-type region thereby forming a PIN photodiode. The narrow-FOV photodiode may comprise an APD (avalanche photodiode), which may require a reverse bias voltage to boost sensitivity. The narrow FOV connection 338 may provide a reverse bias voltage to the APD and/or transmit received signals from the narrow FOV detector 330 to the sub-mount 314. The sub-mount 314 may include a PCBA, which may further include a CPU, a power source, a display, a reverse-bias voltage connection, and/or other optical electronics components known in the art.

Figure 4A:
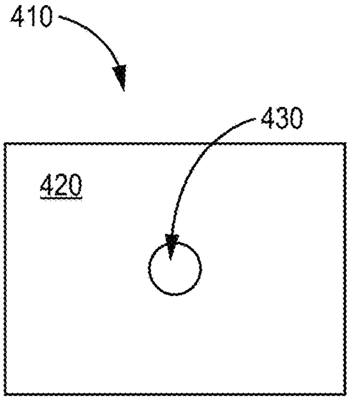
FIG. 4A illustrates a front view of an exemplary photosensitive area for use in an optical detection system, according to some embodiments.
Figure 4B:
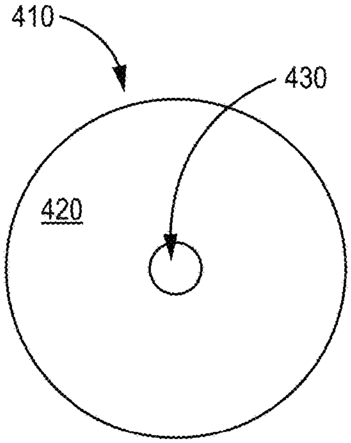
FIG. 4B illustrates a front view of an exemplary photosensitive area for use in an optical detection system, according to some embodiments.

FIGS. 4A-4E illustrate front views of an exemplary photosensitive area 410 for use on an optical detection system. As shown in FIG. 4A, the photosensitive area 410 may include a wide FOV detector 420 surrounding a narrow FOV detector 430. The wide FOV detector 420 may be arranged in different geometric shapes (e.g., FIG. 4A showing a rectangular shape and FIG. 4B showing a circular shape). Other geometric shapes may be used for the wide FOV detector 420 and the narrow FOV detector 430. The wide FOV detector 420 may have a larger surface area than the narrow FOV detector 430.

Figure 4C:
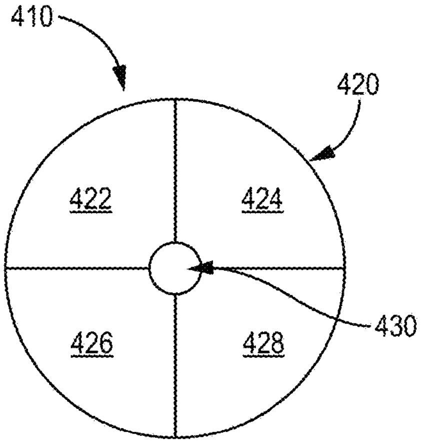
FIG. 4C illustrates a front view of an exemplary photosensitive area for use in an optical detection system, according to some embodiments.

In some embodiments such as FIG. 4C, the wide FOV detector 420 may include a plurality of segments, e.g., a first segment 422, a second segment 424, a third segment 426, and a fourth segment 428. In other embodiments, a different number of segments and/or different shaped segments may be used. Each of the one or more segments may include a photodiode corresponding to a sub-FOV. The segments 422, 424, 426, 428 may be electrically separate from each other such that a separate electrical signal is generated by each segment for later processing that may include difference signal or summation signal generation. The detection of an optical signal upon a segment may indicate that the light source is located within the respective sub-FOV, and thus, the plurality of segments may help the optical detection system locate the source.

Figure 4D:
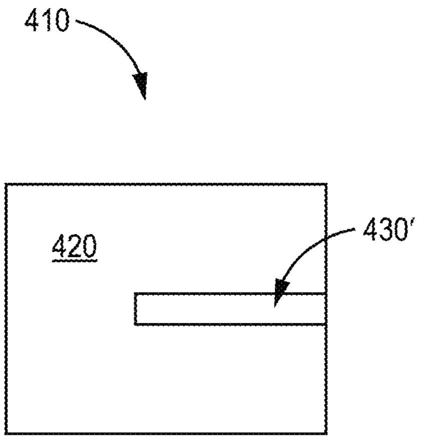
FIG. 4D illustrates a front view of an exemplary photosensitive area for use in an optical detection system, according to some embodiments.
Figure 4E:
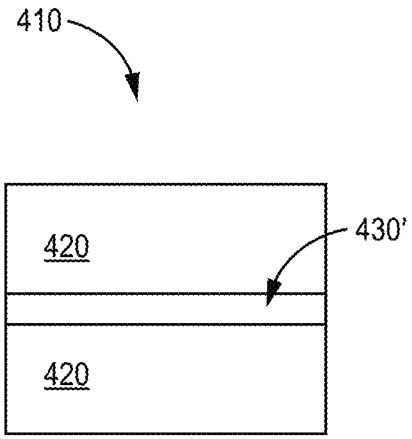
FIG. 4E illustrates a front view of an exemplary photosensitive area for use in an optical detection system, according to some embodiments.

FIGS. 4D-4E illustrate front views of exemplary photosensitive areas 410 including asymmetric narrow FOV detectors 430'. For instance, in FIG. 4D the narrow FOV detector 430' has a greater horizontal length than vertical length. In FIG. 4E, the narrow FOV detector 430' has a horizontal length equal to the horizontal length of the wide FOV detector 420. Such designs (FIGS. 4D-4E) may be implemented for manufacturing simplicity, to remove signals from the central area with front side wirebonds, and/or can be used to allow for large amounts of transmitter to receiver parallax that can exist in systems where the modulated narrow FOV light source is located offset from the optical system.

Figure 5:
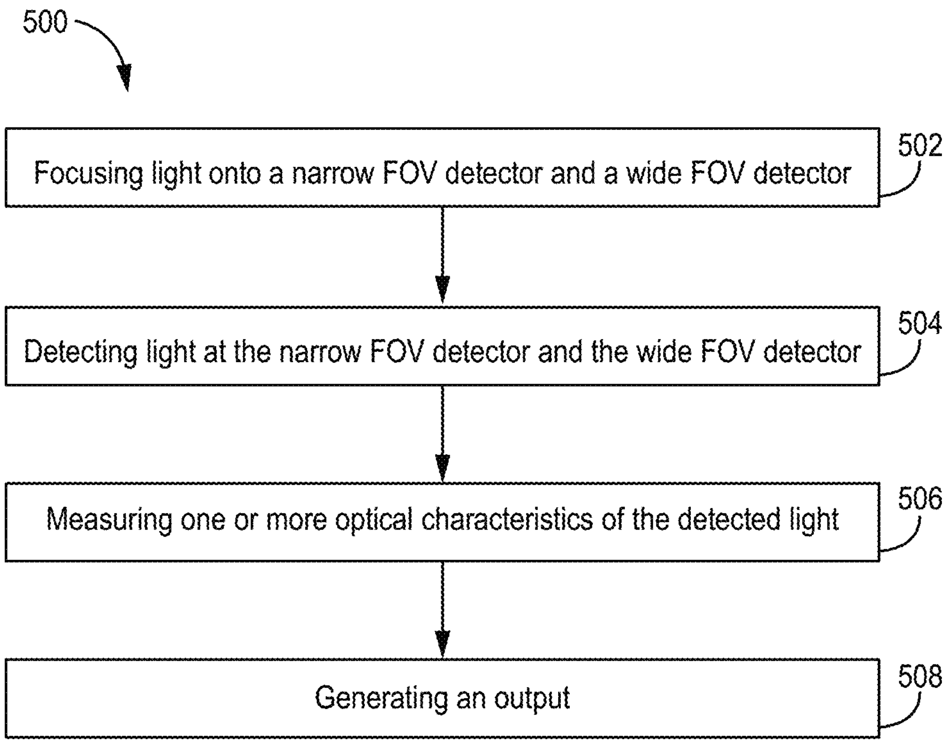
FIG. 5 illustrates an exemplary flow chart for a method of detecting a presence and location of a modulated light source, according to some embodiments.

FIG. 5 illustrates an exemplary flow chart for a method of detecting a presence and location of a modulated light source. The method 500 includes focusing light onto a narrow FOV detector and a wide FOV detector 502. In some embodiments, light may be focused onto the narrow FOV detector and the wide FOV detector by an optical lens, an optical filter, or any other optical device known in the art.

The method 500 further includes detecting incident light at the narrow FOV detector and the wide FOV detector 504. In some embodiments, light may be detected via a P/N, PIN, and/or APD photodiode. A photovoltaic substrate may be used to convert optical signals into electrical signals. In some embodiments, the narrow FOV detector and the wide FOV detector may be configured to receive and detect incident light simultaneously. The step 504 may include removing a background light/noise from the detected light.

The method 500 further includes measuring one or more optical characteristics of the detected light 506. For instance, the narrow FOV detector and/or the wide FOV detector may measure a wavelength, intensity, amplitude, polarization, phase, pulse length, etc. of a received optical signal. The step 506 may include comparing a received optical signal to one or more thresholds to determine whether a modulated light source is present within a FOV. The step 506 may further include determining a location of the modulated light source within a FOV. In some embodiments, step 506 may include removing a background light/noise before measuring one or more optical characteristics.

The method 500 further includes generating an output based on the optical characteristics of the received light 508. The step 508 may include generating an output on a presence of modulated light within a FOV. The step 508 may further include generating an output on a location of a modulated light source within a FOV. In some embodiments, the step 508 may include generating an optical output, generating an auditory output, or otherwise notifying the user of a presence and/or location of a modulated light source. In some embodiments, step 508 may include sending an output signal to one or more extrinsic systems via Bluetooth, wired, or wireless connection. In some embodiments, step 508 may include generating an output to change an orientation and/or position of the narrow FOV detector and/or the wide FOV detector. For instance, when a presence of a modulated light source is detected, the wide and/or narrow FOV detector(s) may point toward the received modulated light to determine a location of the modulated light source. In some embodiments, the step 508 may include generating a countermeasure output, e.g., a laser jammer, smoke screen, aerosol screen, etc.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. An optical detection system, comprising:

a lens having a focal plane;

a wide field of view (FOV) detector configured to detect incident light at the focal plane corresponding to a wide FOV, wherein the wide FOV detector includes a window to allow incident light to pass through;

a narrow FOV detector configured to detect incident light at the focal plane corresponding to a narrow FOV, wherein the narrow FOV detector is positioned to detect the incident light passed through the window, wherein the narrow FOV is smaller than the wide FOV; and wherein the wide FOV detector and the narrow FOV detector are located in a single detection plane relative to the lens, wherein the wide FOV detector includes a first type of optical detector element and wherein the narrow FOV detector includes a second type of optical detector element, wherein the second type of optical detector element is more sensitive than the first type of optical detector element.

2. The optical detection system of claim 1, wherein the optical detection system is configured to receive the incident light corresponding to the wide FOV and the incident light corresponding to the narrow FOV through a single optical path.

3. The optical detection system of claim 1, wherein the wide FOV detector has a first surface area and the narrow FOV detector has a second surface area, wherein the first surface area is greater than the second surface area.

4. The optical detection system of claim 1, wherein the wide FOV detector of the optical detection system is configured to detect a presence of a modulated light source not originating from the optical detection system.

5. The optical detection system of claim 4, wherein the narrow FOV detector comprises a photodiode and wherein the optical detection system is configured to determine the location of the modulated light source based on detection of the incident light within a corresponding field of view of the narrow FOV detector.

6. The optical detection system of claim 5, wherein the wide FOV detector includes a plurality of photodiodes, each of the plurality of photodiodes defining a detector segment.

7. The optical detection system of claim 6, wherein each of the plurality of detector segments corresponds to a sub-FOV, wherein a sum of all of the sub-FOVs is equal to the wide FOV.

8. The optical detection system of claim 5, wherein photodiode of the narrow FOV detector comprises an avalanche photodiode (APD).

9. The optical detection system of claim 1, wherein the window includes a window area, wherein the window area is smaller than a narrow FOV detector area.

10. The optical detection system of claim 1, further comprising an optical filter, wherein the optical filter is configured to remove a background light.

11. The optical detection system of claim 1, wherein the lens consists of a single optical lens.

12. The system of claim 1 further comprising a sub-mount in communication with a processing unit, wherein a first wired connector electrically couples the wide FOV detector to the sub-mount and wherein a second wired connector electrically couples the narrow FOV detector to the sub-mount, wherein the first wired connector collects first charge carriers of the wide FOV detector and wherein the second wired connector collects second charge carriers of the narrow FOV detector.

13. The system of claim 1 further comprising a detector substrate positioned above the wide FOV detector and the narrow FOV detector, the detector substrate including an n-type semiconductor layer.

* * * * *